United States Patent Office 2,786,036
Patented Mar. 19, 1957

2,786,036

PREPARATION OF POLYMERIZATION INITIATORS

Louis R. Freimiller, Philadelphia, and Charles H. McKeever, Meadowbrook, Pa., assignors to Rohm & Haas Company, Philadelphia, Pa., a corporation of Delaware No Drawing. Application September 22, 1955, Serial No. 536,030

3 Claims. (Cl. 252—431)

This invention concerns initiators for polymerizing olefins and deals with a method for the preparation of these initiators. With greater particularity, this method comprises reacting a lead tetraalkyl, specifically lead tetraethyl, and aluminum chloride in an anhydrous system under an inert atmosphere and separating by distillation catalytically reactive aluminum alkyl compounds which are modified and activated by containing small amounts of lead and chlorine compounds.

There have been reacted by mixing and standing lead tetraethyl and aluminum chloride in chloroform followed by extracting with water and hydrochloric acid to separate lead chloride. The product is not an effective initiator for polymerizing olefins.

Polymerization of olefins has been reported under the influence of lithium aluminum hydride, aluminum triethyl etherate and the like. For example, dimerization of propylene has been promoted by aluminum triethyl or trimethyl at 180° to 200° C. at 40 to 180 or more atmospheres pressure over a period of time. It has been found that the activated aluminum alkyls, prepared according to the process of this invention, are more effective than the aluminum compounds previously reported and lead to a higher degree of polymerization.

Our method comprises mixing with stirring and cooling, best below 50° C., aluminum chloride and lead tetraethyl under an inert atmosphere and under anhydrous conditions. The mixture is then heated at 80° to 90° C. for about a quarter hour to two hours to complete substantially the reaction and the temperature of the reaction mixture is gradually heated to 145° to 170° C., still under an inert atmosphere, to decompose any remaining lead tetraethyl. This object may be accomplished in about one-half hour to about three hours, the time required being in general inversely proportional to the temperature. The heated reaction mixture is then subjected to distillation. Distillation may be performed at normal atmospheric pressure, but distillation under reduced pressure is preferred, pressures below 20 mm., e. g. 20 mm. to 0.2 mm., being practical and useful. The distillate is an unusually reactive initiator for polymerizing olefins. If desired, the original distillate may be fractionally redistilled to give even more catalytically effective fractions.

If distillation is performed in the usual range of atmospheric pressures, it is carried on at 190° to 205° C. At a pressure of about 20 mm. of mercury temperatures of distillation between 95° and 110° C. are found, while at about 10 mm. temperatures of distillation fall between 85° and 100° C. At lower pressures temperatures of distillation will, of course, be still lower.

Generally it is best to use an excess of aluminum chloride over lead tetraethyl to help avoid free lead tetraethyl in the final product. A mole ratio of 1.1 to 1.6 of aluminum chloride is best used per mole of lead tetraethyl.

The product obtained is an activated aluminum ethyl which contains some lead and some chlorine in combined forms. The amounts of these can vary from about 0.02% to 5% in the crude distillates and from about 0.01% to 2% in the fractionated products, varying somewhat with the particular fraction. No free lead tetraethyl is present. The distillates which are obtained ignite spontaneously when exposed to air. They act as polymerization catalysts, tending to give trimers and higher polymers together with some dimers of olefinic hydrocarbons, differing in this respect from conventional aluminum alkyls.

In a typical preparation according to this invention, there was added with stirring little by little 86 parts by weight of aluminum chloride to 161.6 parts by weight of lead tetraethyl in a reaction vessel blanketed with dry nitrogen. This vessel was cooled with an ice bath so that during the addition the temperature of the mixture was controlled and kept near 0° C. The reaction mixture was heated to 85° C. for a half hour, then at about 150° C. for an hour, and finally at 165° to 170° C. for a half hour. The reaction mixture was cooled and distilled under low pressure. The product fraction was taken at 43°–90° C./0.3-mm. The distillate of about 67 parts by weight was kept under dry nitrogen. It was found to be very active as a catalyst for polymerizing ethylene, propylene, 1-dodecene, and other olefins.

The above procedure was repeated. The entire distillate obtained was transferred under dry nitrogen to a still having a short fractionating column. The distillate was fractionated at low pressure as follows: at 46° to 48° C./0.6 to 0.7 mm., 10 parts; at 48° to 51° C./0.7 mm., 32.5 parts; at 51° to 53° C./0.75 to 0.8 mm., 15 parts; at 53° to 54° C./0.8 mm., 3.0 parts; and residue 3.0 parts. All fractions were found effective for polymerizing ethylene and propylene. Fraction No. 2 was most active. The catalyst could be recycled in the polymerization reactions of olefins with but slight impairment of efficiency.

While lead tetraethyl has been used above, particularly as a matter of convenience since it is commercially available, other lead tetraalkyls can be used in similar manner to give corresponding aluminum alkyls of good catalytic activity.

This application is a continuation-in-part of our application Serial No. 454,192, filed September 3, 1954, and now abandoned.

We claim:

1. A process for preparing an activated aluminum alkyl polymerization catalyst for olefins which comprises mixing with stirring and cooling under anhydrous conditions and under an inert atmosphere aluminum chloride and lead tetraethyl as the essential reactants, the aluminum chloride being in molecular excess of the lead tetraethyl, heating the reaction mixture to about 80° to 90° C. substantially to complete reaction between the aluminum chloride and lead tetraethyl, then heating the resulting mixture to 145° to 170° C. to decompose any remaining lead tetraethyl, and distilling off the reaction product.

2. A process for preparing an activated aluminum alkyl polymerization catalyst for olefins which comprises mixing with stirring and cooling to maintain the temperature of the mixture below 50° C. and under an inert atmosphere and anhydrous conditions aluminum chloride and lead tetraethyl in a mole ratio from 1.1 to 1.6 of aluminum chloride per mole of lead tetraethyl, heating the reaction mixture to about 80° to 90° C. for about one-quarter hour to two hours to complete substantially the reaction, heating the resulting mixture to 145° to 170° C. for a time between about three hours and about one-half hour, and distilling off the reaction product at a pressure below about 20 mm.

3. The product of the process of claim 2, characterized in that it is an activated catalyst for polymerizing olefins and contains in chemical combination aluminum triethyl modified with small amounts of lead and chlorine.

References Cited in the file of this patent

UNITED STATES PATENTS

| | | |
|---|---|---|
| 2,388,428 | Mavity | Nov. 6, 1945 |
| 2,447,926 | Wiczer | Aug. 24, 1948 |